United States Patent [19]

Kushida et al.

[11] 4,419,409

[45] Dec. 6, 1983

[54] BICOLORED POLYHEDRAL BODY OF ALUMINUM

[75] Inventors: Machiro Kushida, Sayama; Tsuneji Takasugi, Hanno; Kenji Irie, Yokohamashi, all of Japan

[73] Assignee: Citizen Watch Co. Ltd., Tokyo, Japan

[21] Appl. No.: 418,995

[22] Filed: Sep. 16, 1982

Related U.S. Application Data

[62] Division of Ser. No. 234,176, Feb. 13, 1981, Pat. No. 4,375,391.

[30] Foreign Application Priority Data

Feb. 27, 1980 [JP] Japan .................................. 55-23522

[51] Int. Cl.[3] .......................... B32B 1/10; B32B 15/20

[52] U.S. Cl. .................................. 428/469; 204/35 N

[58] Field of Search ................. 204/18.1, 35 N, 38 A, 204/42, 58; 428/469

[56] References Cited

U.S. PATENT DOCUMENTS 2,963,409 12/1960 Ramirez ................................ 204/58
3,016,293 1/1962 Cybriwsky et al. .................... 41/41
3,622,472 11/1971 Izumikawa ....................... 204/35 N
4,066,516 1/1978 Sato ....................................... 204/15

*Primary Examiner*—John F. Niebling
*Assistant Examiner*—William Leader

[57] ABSTRACT

The polyhedral body of aluminum such as a watch case obtained by the inventive method is colored in two different colors on different polyhedral faces demarcated by the ridgeline therebetween with remarkable decisiveness not obtained in the prior art methods. The inventive method utilizes anodization and coloring by dyeing in two steps. A part of the polyhedral faces anodized and colored in a dark color in the first step is ground to expose the bare surface of aluminum, which is then activated by dipping in an aqueous acid solution and again anodized by applying an unconventionally high voltage in an electrolyte bath of a specific composition followed by coloring in a light color decoratively distinguishable from the dark color imparted in the first step coloring. By virtue of the activation treatment of the bare aluminum surface and the unusual conditions in the second anodization, the demarcation between the differently colored polyhedral faces is very decisive and beautiful and the oxide films on both sides of the ridgeline have excellent adhesion and high anti-corrosion resistance.

2 Claims, 5 Drawing Figures

BICOLORED POLYHEDRAL BODY OF ALUMINUM

This is a division of application Ser. No. 234,176, filed Feb. 13, 1981, now U.S. Pat. No. 4,375,391.

BACKGROUND OF THE INVENTION

The present invention relates to a method for manufacturing a bicolored polyhedral body of aluminum or, more particularly to a method for providing decorative coloring on the surface of a polyhedral body made of aluminum or an alloy mainly composed of aluminum in two different colors, in which the faces colored in dark and in light are decisively and beautifully demarcated by the ridgeline of the polyhedral body.

Needless to say, a diversity of articles made of aluminum or an aluminum alloy (hereinafter referred to simply as aluminum) and anodized and colored on the surface are widely used by virtue of their lightness in weight and beautifulness as well as their high anti-corrosion resistance. For example, aluminum-side watch cases have acquired a commercial success with anodization and coloring on the surface. These conventional aluminum-made watch cases are, however, colored in a single tone so that there has been an eager demand to overcome the monotonousness of the unicolored cases and to further enhance the aesthetic value of them by providing bicolored surfaces to the watch case in dark and light colors.

Such a bicolored polyhedral body, in particular, watch case, of aluminum can be obtained in principle by subjecting an anodized and colored article with a partly removed surface layer to a second anodization and coloring treatment in a different color. This conventional method is not always satisfactory because the anodized and colored surface film of the article formed in the first step is readily degraded in the second anodization and coloring treatment resulting in poor surface properties. Various attempts have been made to overcome the above mentioned problems in the prior art method of two-step anodization and coloring treatment but without noticeable success.

SUMMARY OF THE INVENTION

It is therefore an object of the present invention to provide a novel and improved method for manufacturing a bicolored polyhedral body of aluminum in a two-step anodization and coloring treatment, according to which the faces of the polyhedral body colored in dark and in light are decisively and beautifully demarcated by the ridgeline of the body between the faces and the surface film of the oxide on the dark-colored face formed in the first anodization and coloring treatment is free from deterioration in the second anodization and coloring treatment.

Another object of the invention is to provide a novel and improved aluminum polyhedral body colored in two different colors as manufactured according to the method described hereunder.

The method of the invention for manufacturing a bicolored polyhedral body of aluminum comprises the steps of (a) anodically oxidizing the surface of the aluminum body to form an oxide film on the surface, (b) coloring the oxide film on the surface of the body in a dark tone color, (c) subjecting the thus anodized and colored surface to a sealing treatment, (d) mechanically removing the oxide film on the surface from a part of the polyhedral faces of the body to expose bare aluminum surface, (e) activating the thus exposed bare aluminum surface, (f) anodically oxidizing the thus activated bare aluminum surface in an electrolyte bath containing at least one organic acid by the application of a voltage in the range from 50 to 80 volts to form an oxide film on the surface, (g) coloring the oxide film on the surface of the body formed in the second anodization in a light tone color, and (h) subjecting the thus anodized and colored surface to a second sealing treatment.

DETAILED DESCRIPTION OF THE PREFERRED EMBODIMENTS

The definition of the polyhedral body here implied is, though it may be not in strict compliance with a geometrical definition, a body having at least two faces, which may be flat or curved, intersecting to form one or more ridgelines and desired to be colored in different colors on the different faces for a reason of aesthetic viewpoint. Typical examples of the polyhedral body are watch cases, bracelets and other ringwise articles and bandages but any other bodies having a ridgeline are equally applicable to the inventive method.

According to the inventive method, the polyhedral body of aluminum is colored in a combination of two different colors on different faces. The two different colors have desirably a definite difference in luminosity in dark and light. Examples of the dark color are black, dark blue, dark brown, dark green, deep red and the like and the light color is exemplified by golden yellow, silver white, yellow, light green, light blue and the like. The combination of the dark and light colors is not limitative and may be selected from the aesthetic viewpoint. For example, combinations of black and gold, brown and gold, black and silver white and the like may be preferred though not limited thereto.

The polyhedral body is made of aluminum or an aluminum alloy of any kind provided that the alloy is susceptible to anodic oxidation.

For better comprehensibility, the following description is given with reference to an aluminum-made watch case but it should be understood that the applicability of the inventive method is not limited to watch cases but extends to any kind of polyhedral aluminum bodies.

Figure 1:
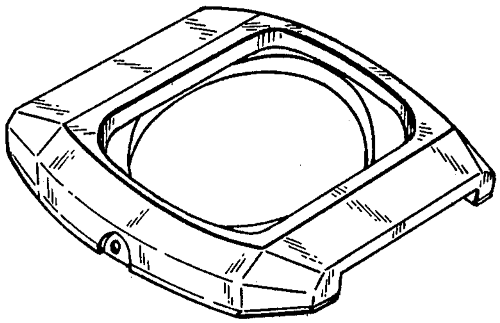
FIG. 1 is a perspective view of a blank of a watch case as an example of the polyhedral body before coloring.
Figures 2A, 2B, 2C:
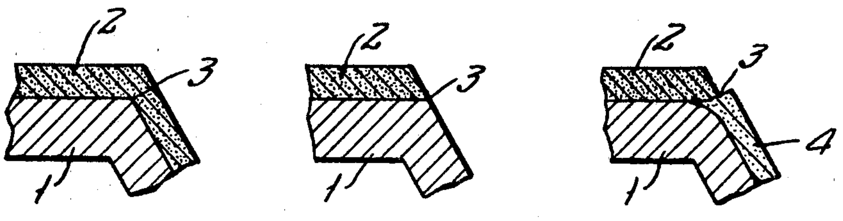
FIGS. 2*a*, 2*b* and 2*c* illustrate each a step of the inventive method by a partial enlarged cross section of the polyhedral body.

FIG. 1 is a perspective view of a blank of a watch case obtained by machining such as punching and cutting. Prior to the first anodization, the blank of the watch case is degreased and washed in a conventional manner. The thus cleaned blank is then anodically oxidized in an electrolyte bath containing, for example, sulfuric acid to form an anodically oxidized oxide film on the surface. Typical electrolytic conditions for this first anodization are: temperature from −10° to +10° C.; voltage from 30 to 40 volts; current density from 3 to 6 amperes/dm$^2$; and time of electrolysis from 30 to 60 minutes. By this anodic oxidation, an oxide film 2 is formed on the surface of the aluminum base 1 on both sides of the ridgeline 3 as is shown in FIG. 2a by a partial enlarged cross section. The thickness of the thus formed oxide film is usually in the range from 40 to 60 μm.

After completion of the first anodization treatment as described above followed by rinsing with water, the blank is dipped in a dye solution to be dyed in a dark tone color, for example, in black. The dyeing conditions may widely differ depending on the kind of the dye and the concentration of the dyeing solution but usually dipping of the blank in a dye solution at 50° C. or higher for 10 to 30 minutes is sufficient. The thus dyed blank is then rinsed with water and subjected to a sealing treatment in hot pure water, for example, at 90° C. for 10 to 60 minutes to finish a unicolored blank of the watch case colored in black allover the surface.

One or more particular faces of the blank thus colored in a dark color are then mechanically worked, e.g. ground, to remove the colored oxide layer and to expose bare surface of the aluminum base and polished by buffing. Care should be taken in this case that the neatness of the ridgeline 3 or rather the demarcating line between the remaining oxide layer 2 and the exposed bare face of aluminum is not unduly impaired as is shown in FIG. 2b by the cross section.

The next step is the activation of the thus exposed and polished bare surface of the aluminum base. This activation treatment is carried out by dipping the blank in an aqueous acid solution. Suitable acid solutions are sulfuric acid in a concentration of 20 to 50% by weight and nitric acid in a concentration of 5 to 40% by weight at a temperature from 15° to 40° C. and the dipping time is usually from 1 to 5 minutes. The conditions for this activation treatment should be determined not to deteriorate the colored oxide film 2 obtained in the first anodization and coloring treatment and not to reduce the metallic luster on the mirror-polished bare aluminum surface.

The blank thus activated on the bare aluminum surface is then subjected to a second anodization in an electrolyte bath containing at least one organic acid. Suitable organic acids are exemplified by oxalic acid, tartaric acid, malic acid, sulfophthalic acid and the like and they may be used either alone or as a combination of two kinds or more. The concentration of the organic acid is usually in the range from 3 to 200 g/liter in the electrolyte bath.

Characteristically different from the first anodization, the second anodization is carried out by applying a voltage in the range from 50 to 80 volts, condiserably higher than in the first anodization. Other electrolytic conditions are: temperature from 20° to 40° C.; current density from 3 to 6 amperes/dm$^2$; and time of electrolysis from 15 to 40 minutes. The oxide film formed by this second anodization should have a thickness of at least 20 μm or, preferably, at least 30 μm in order that the finished watch case has a sufficient anti-corrosion resistance and anti-scratch resistance as well as full decorativeness as is required for an ornamental article such as watches.

It has been generally understood in repeating anodization treatment of the aluminum surface that the voltage in the second anodization should be lower than in the first anodization because otherwise the oxide film formed in the first anodization is deteriorated and readily exfoliated in the second anodization treatment. As a disadvantage inherent to such a low-voltage anodization, the rate of oxide film formation in the second anodization is necessarily low and an excessively long time is taken to obtain a desired thickness of the oxide film again causing deterioration of the oxide film obtained in the first anodization treatment.

Notwithstanding the above described problems in the conventional second anodization treatment, the second anodization treatment in the inventive method can be performed with a higher voltage of 50 to 80 volts without causing deterioration of the oxide film formed in the first anodization treatment. This unexpected advantage is obtained presumably by virtue of the preceding activation treatment of the bare surface of the aluminum base resulting in a thick barrier layer between the aluminum surface and the oxide film without decreasing the metallic luster of the activated surface which in turn leads to the improvement of the adhesion of the oxide film to the aluminum surface and the anti-corrosion resistance of the surface. In other words, the second anodization treatment should be carried out with the composition and concentration of the electrolyte bath and the electrolytic conditions to satisfy these requirements within the limitations above described.

After completion of the second anodization treatment followed by rinsing with water, the blank is colored by dipping in a second dyeing solution containing a dye of a light tone color, for example, golden yellow. The dyeing conditions may be the same as in the first dyeing. The final step of the inventive method is the second sealing treatment which may be carried out under conventional conditions to give a bicolored blank of the watch case as is shown in FIG. 2c by a cross section in which the dark-colored face 2 and the light-colored face 4 are decisively and beautifully demarcated by the ridgeline 3.

As is shown by the enlarged cross section in FIG. 2c, interstitial intrusion of the peripheral margin of the oxide film 4 formed in the second anodization is found between the oxide film 2 formed in the first anodization and the aluminum surface along the ridgeline 3. This phenomenon of interstitial intrusion of the oxide film 4 is very effective in emphasizing the color contrast between the dark- and light-colored faces with the demarcating line 3 as well as to ensure high anti-corrosion resistance and adhesion of both of the oxide films 2 and 4.

As is understood from the above description, the bicolored polyhedral bodies obtained by the inventive method are characteristic in the decisive and beautiful demarcation of two faces colored in dark and light on both sides of the ridgeline as well as in the excellent adhesion and anti-corrosion resistance of the oxide films formed in both of the first and the second anodization treatments.

Following is an example to illustrate the inventive method in further detail, in which the inventive method was applied to an aluminum-made watch case, but not to limit the scope of the invention in any way.

EXAMPLE (i) A blank of watch case as shown in FIG. 1 was prepared from an aluminum slab by punching under press, cutting and grinding. The blank was degreased and cleaned by dipping first in a 7% aqueous solution of sodium hydroxide at 70° C. for 2 minutes and then in a 35% nitric acid solution at 50° C. for 1 minute followed by rinsing with water.

(ii) The blank was anodized in an electrolyte bath at 0° C. containing 150 g/liter of sulfuric acid and 15 g/liter of glycerin for 40 minutes with a current density of 4 amperes/$dm^2$ by applying a voltage of 35 volts followed by rinsing with water. The oxide film formed in this first anodization had a thickness of about 50 $\mu$m.

The thus anodized blank was dipped in a dyeing solution containing 10 g/liter of a black dye (Alumisol Black MLB, a tradename) at 50° C. or higher for 30 minutes to be dyed in black and then subjected to a sealing treatment in pure water at 90° C. for 30 minutes followed by drying.

Figure 3:
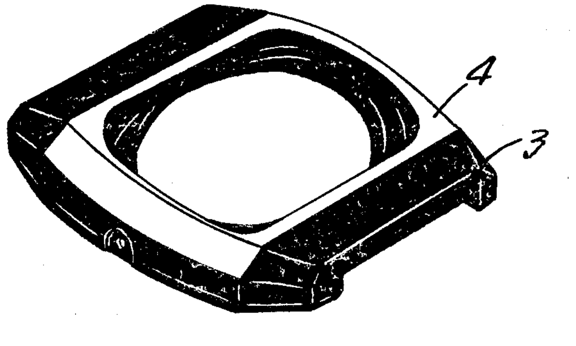
FIG. 3 is a perspective view of a bicolored watch case finished by the inventive method.

(iii) Several faces of the blank, i.e. the faces 4 shown in white in FIG. 3, were mechanically ground to remove the black-colored oxide film and to expose the bare surface of the aluminum base which was mirror-polished by buffing.

(iv) The blank was dipped in a 400 g/liter solution of sulfuric acid at 30° C. for 2 minutes to have the polished bare surface of the aluminum base activated. After rinsing with water, the thus activated surface was anodized in an electrolyte bath at 30° C. containing 100 g/liter of sulfophthalic acid, 50 g/liter of oxalic acid, 10 g/liter of tartaric acid and 5 g/liter of malic acid for 20 minutes with a current density of 4 amperes/$dm^2$ applying a voltage of 60 volts. The oxide film formed in this second anodization treatment had a thickness of about 30 $\mu$m.

In the next place, the thus anodized blank was dipped in a dyeing solution containing 10 g/liter of a golden yellow dye (Alumisol Gold ZL, a tradename) at 50° C. or higher for 30 minutes to be dyed in beautiful golden color on the surface of the oxide film formed in the second anodization followed by the second sealing treatment in water at 90° C. for 30 minutes.

The thus finished blank of watch case had an appearance as illustrated in FIG. 3 by a perspective view colored in pure black on the faces 2 shown in black in the figure and in golden yellow on the faces 4 shown in white in the figure with very sharp demarcating lines 3.

What is claimed is:

1. A bicolored polyhedral body made of aluminum having at least a first face and a second face with an anodically oxidized layer on the surface of the aluminum body, said first and second faces being demarcated by a ridgeline and colored in different colors wherein the peripheral margin of the anodically oxidized layer on the second face extends and intrudes interstitially between the anodically oxidized layer on the first face and the surface of the aluminum body.

2. The bicolored polyhedral body made of aluminum as claimed in claim 1 wherein the color on the second face is lighter in luminosity than the color on the first face.

* * * * *